United States Patent
Cho et al.

(10) Patent No.: US 9,293,950 B2
(45) Date of Patent: Mar. 22, 2016

(54) WIRELESS POWER TRANSMISSION APPARATUS

(71) Applicant: ELECTRONICS AND TELECOMMUNICATIONS RESEARCH INSTITUTE, Daejeon (KR)

(72) Inventors: In Kui Cho, Daejeon (KR); Je Hoon Yun, Daejeon (KR); Seong-Min Kim, Daejeon (KR); Jung Ick Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 597 days.

(21) Appl. No.: 13/721,824

(22) Filed: Dec. 20, 2012

(65) Prior Publication Data

US 2013/0221757 A1 Aug. 29, 2013

(30) Foreign Application Priority Data

Feb. 29, 2012 (KR) ........................ 10-2012-0021189

(51) Int. Cl.
*H02J 17/00* (2006.01)
*H02J 5/00* (2006.01)
*B60L 11/00* (2006.01)
*B60L 11/18* (2006.01)

(52) U.S. Cl.
CPC ............... *H02J 17/00* (2013.01); *B60L 11/007* (2013.01); *B60L 11/182* (2013.01); *B60L 11/1825* (2013.01); *H02J 5/005* (2013.01); *B60L 2200/12* (2013.01); *Y02T 10/7005* (2013.01); *Y02T 90/121* (2013.01); *Y02T 90/122* (2013.01); *Y02T 90/128* (2013.01); *Y02T 90/14* (2013.01)

(58) Field of Classification Search
CPC ............................... H02J 17/00; Y02T 90/122
USPC .......................................................... 307/104
See application file for complete search history.

(56) References Cited

U.S. PATENT DOCUMENTS

2009/0224856 A1   9/2009   Karalis et al.
2010/0231340 A1*  9/2010   Fiorello et al. .................. 336/92

(Continued)

FOREIGN PATENT DOCUMENTS

JP        2011-177018 A    9/2011
KR    1020090098239 A    9/2009

(Continued)

*Primary Examiner* — Scott Bauer
(74) *Attorney, Agent, or Firm* — Ladas & Parry LLP (57) ABSTRACT

A wireless power transmission apparatus includes: a transmission resonator installed in one side wall within a specific space and configured to comprise a transmission feeding loop for transmitting impedance matching and power and receive and transmit the impedance matching and power using the transmission feeding loop. Further, the wireless power transmission apparatus includes a relay resonator installed in another side wall within the specific space and configured to have a resonant frequency identical with that of the transmission resonator and store energy in the specific space by generating mutual resonance through a resonance characteristic with the transmission resonator; and one or more reception resonators installed within the specific space and configured to have a resonant frequency identical with that of the transmission resonator and receive the energy stored in the specific space.

13 Claims, 8 Drawing Sheets

(56) References Cited

U.S. PATENT DOCUMENTS

| | | | |
|---|---|---|---|
| 2012/0001497 A1* | 1/2012 | Sada et al. | 307/104 |
| 2012/0013198 A1* | 1/2012 | Uramoto et al. | 307/104 |
| 2012/0019075 A1 | 1/2012 | Cho et al. | |
| 2012/0049643 A1 | 3/2012 | Ryu et al. | |
| 2012/0248884 A1 | 10/2012 | Karalis et al. | |
| 2014/0021907 A1* | 1/2014 | Yu et al. | 320/108 |

FOREIGN PATENT DOCUMENTS

| | | |
|---|---|---|
| KR | 1020120010652 A | 2/2012 |
| KR | 1020120019033 A | 3/2012 |

\* cited by examiner

FIG.10

WIRELESS POWER TRANSMISSION APPARATUS

CROSS-REFERENCE TO RELATED APPLICATION(S)

The present invention claims priority of Korean Patent Application No. 10-2012-0021189, filed on Feb. 29, 2012, which is incorporated herein by reference.

FIELD OF THE INVENTION

The present invention relates to wireless power transmission and, more particularly, to a wireless power transmission apparatus in a specific three-dimensional space which is capable of transmitting power within a specific space by installing a transmission resonator to which a porter matching and resonant matching circuit is attached in a spiral coil structure between a transmission resonator and a relay resonator spaced apart from each other at a specific interval.

BACKGROUND OF THE INVENTION

Energy is a glossary indicating an ability to work and is a physical term, such as heat, electricity, and force. In the present age, representative examples of this energy include a variety of energies, such as electric energy, thermal power energy, hydraulic energy, and thermal energy.

In the case of electric energy, the most basic method of transferring the energy is to transfer the energy through a conductor through which an electric current can flow.

Another method of transferring electric energy includes a method using an electric field in order to generate power. This method corresponds to technology for transmitting power from one side to the other side by a primary coil and a secondary coil using induced electromotive force that is induced by a magnetic field and an electric field. This method is basically used in a power plant.

As yet another method, a method of transmitting energy wirelessly includes radio wave technology for transmitting a signal having specific power on air. This radio wave technology is widely used in wireless communication methods, but is not an efficient energy transmission method.

Meanwhile, a new method of transferring power was developed in Massachusetts Institute of Technology (MIT) in 2007. The new method relates to technology for transmitting energy wirelessly. In this technology, wireless energy is transmitted through mutual resonance based on magnetic field resonance using a magnetic resonant body having two same frequencies unlike in the existing antenna. In the method disclosed by MIT, the magnetic resonant body has a helical structure and a resonant frequency of 10 MHz. The structural helical resonant body of the resonant body is 600 mm in diameter, 5.25 turns in helical, 6 mm in line thickness, i.e., diameter, and 200 mm in a total helical thickness, and a single feeding loop of a signal is 250 mm.

The method developed by MIT is problematic in that the size and resonant frequency are not suitable for being applied to actual products. That is, the resonant body for wireless power transmission is too bulky, and the resonant frequency is most sensitive to the human body. In order to transmit wireless power in an actual product, it is preferred that the resonant frequency be 10 MHz or less. However, the size of a resonance structure is a function of the resonant frequency. That is, in order to lower the resonant frequency used in the method developed by MIT, that is, in order to lower the resonant frequency, there is a problem in that the size in the resonant structure is increased.

SUMMARY OF THE INVENTION

In view of the above, the present invention provides a wireless power transmission apparatus which is capable of lowering the resonant frequency of a resonant body and significantly reducing a resonance size.

Further, the present invention provides the wireless power transmission apparatus which is capable of solving both a resonator size problem and a transmission distance efficiency problem by freely transmitting wireless power at a distance farther than the diameter of an ultra-small-sized resonant body in a specific place using the ultra-small-sized resonant body.

In accordance with a first aspect of the present invention, there is provided a wireless power transmission apparatus, including: a transmission resonator installed in one side wall within a specific space and configured to comprise a transmission feeding loop for transmitting impedance matching and power and receive and transmit the impedance matching and power using the transmission feeding loop; a relay resonator installed in another side wall within the specific space and configured to have a resonant frequency identical with that of the transmission resonator and store energy in the specific space by generating mutual resonance through a resonance characteristic with the transmission resonator; and one or more reception resonators installed within the specific space and configured to have a resonant frequency identical with that of the transmission resonator and receive the energy stored in the specific space.

Further, the reception resonator may have a structure of a direct feeding method.

The resonant frequency may range from 1.7 MHz to 1.8 MHz.

Further, the reception resonators may be attached to a robot or a moving body within the specific space.

Further, the transmission resonator and the transmission feeding loop may be sealed by a shielding body or a shielding sheet for shielding an electromagnetic magnetic field generated from the transmission resonator and the transmission feeding loop.

The relay resonator may be sealed by a shielding body or a shielding sheet for shielding an electromagnetic field generated from the relay resonator.

Further, each of the reception resonators may have a diameter ranging from 50 mm to 70 mm.

In accordance with a second aspect of the present invention, there is provided a wireless power transmission apparatus for wirelessly transmitting power to a moving body equipped with a wheel, including: a transmission resonator installed in a first fixture for fixing one part of the wheel and configured to comprise a transmission feeding loop for transferring impedance matching and power and receive and transmit the impedance matching and power using the transmission feeding loop; a relay resonator installed in a second fixture for fixing another part of the wheel and configured to have a resonant frequency identical with a resonant frequency of the transmission resonator and store energy in a space between the first and the second fixtures by generating mutual resonance through a resonance characteristic with the transmission resonator; and one or more reception resonators installed within the specific space and configured to have a resonant frequency identical with a resonant frequency of the transmission resonator and receive the energy stored in the space between the first and the second fixtures.

Further, the reception resonator may have a structure of a direct feeding method.

Further, the resonant frequency may range from 1.7 MHz to 1.8 MHz.

Further, each of the reception resonators may have a diameter ranging from 50 mm to 70 mm.

The wireless power transmission apparatus in accordance with the present invention is advantageous in that it may be applied to small-sized devices because it has a reduced size and thus a cost may be reduced. Furthermore, the present invention may provide the wireless power transmission apparatus which has a lower resonant frequency than the helical structure of the existing MIT structure and which may be commercialized through a reduced size and the method using the wireless power apparatus.

Furthermore, the wireless power transmission apparatus in accordance with the present invention may uniformly distribute energy within a specific space because the transmission feeding loop is installed only in the transmission resonator and may supply power to a plurality of wireless devices and electronic devices within a specific space because the reception resonator is installed in the specific space.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

Hereinafter, embodiments of the present invention will be described in detail with reference to the accompanying drawings which form a part hereof.

A wireless power transmission apparatus capable of solving both a resonator size problem and a transmission distance efficiency problem by freely transmitting wireless power at a distance farther than the diameter of an ultra-small-sized resonant body in a specific place using the ultra-small-sized resonant body is described below with reference to the accompanying drawings.

Figure 1:
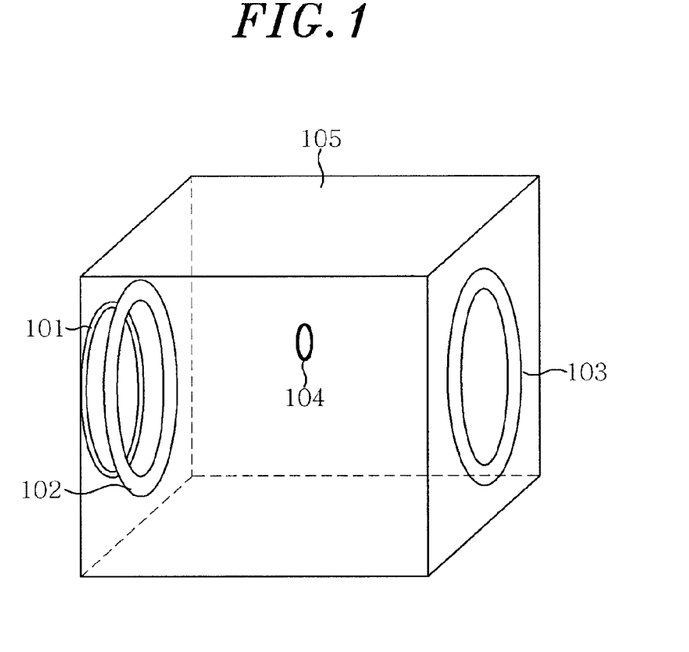
FIG. 1 is a diagram showing the structure of a wireless power transmission apparatus using resonators in accordance with an embodiment of the present invention.

FIG. 1 is a diagram showing the structure of a wireless power transmission apparatus using resonators in accordance with an embodiment of the present invention.

As shown in FIG. 1, the wireless power transmission apparatus may include a transmission resonator 102 including a transmission feeding loop 101, a relay resonator 103, and a reception resonator 104.

In order to clarify a difference, between the structure of the wireless power transmission apparatus in accordance with the embodiment of the present invention and a common wireless power transmission structure, a wireless power transmission using general magnetic resonance is described with reference to FIG. 2.

Figure 2:
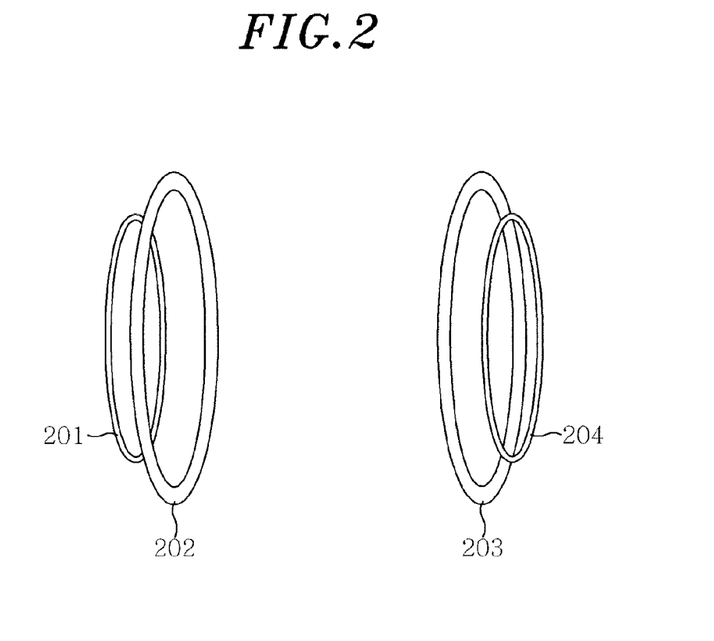
FIG. 2 shows a wireless power transmission structure using general magnetic resonance.

FIG. 2 shows the wireless power transmission structure using general magnetic resonance. The wireless power transmission structure can include two transmission and reception resonators 202 and 203 and two feeding loops 201 and 204 for transmitting and receiving impedance matching and power.

The wireless power transmission structure using general magnetic resonance includes the two transmission and reception resonators and the two feeding loops for transmitting and receiving impedance matching and power as shown in FIG. 2, whereas the wireless power transmission apparatus in accordance with the embodiment of the present invention includes the transmission feeding loop 101 in the transmission resonator 102 only. That is, the wireless power transmission apparatus in accordance with the embodiment of the present invention plays as a relay without a feeding loop on the reception resonator side, and the resonator for receiving power actually can be disposed between the transmission resonator 102 and the relay resonator 103.

The transmission resonator 102 in accordance with an embodiment of the present invention can be installed any one side wall within a specific space 105. The transmission feeding loop 101 for transmitting impedance matching and power can transfer impedance matching and power to the transmission resonator 102 stably.

The transmission resonator 102 has the same resonant frequency as the relay resonator 103 and can generate mutual resonance according to a mutual resonant characteristic using the resonant frequency. Energy can be stored within the space 105 between the transmission resonator 102 and the relay resonator 103 by this mutual resonance. This energy can be transferred to the reception resonator 104 installed within the space 105.

The relay resonator 103 is spaced apart from the transmission resonator 102 at a specific interval. For example, the relay resonator 103 can be installed on a side wall within the space 105 on the opposite side. The relay resonator 103 has the same resonant frequency as the transmission resonator 102 and can store energy within the space 105 by generating mutual resonance through a resonance characteristic with the transmission resonator 102. The energy stored as described above can be transferred to the reception resonator 104 that is installed within the space 105.

The reception resonator 104 has a very smaller size than the transmission resonator 102 and can have the same resonant frequency as the transmission resonator 102. Here, the resonant frequency preferably ranges from 1.7 MHz to 1.8 MHz.

Furthermore, the reception resonator 104 can be installed between the transmission resonator 102 and the relay resonator 103, that is, within the space 105. The reception resonator 104 can receive energy stored in the space 105.

The reception resonator 104 can have a structure of a direct feeding method and can have a C-C matching structure, for example.

Figure 3:
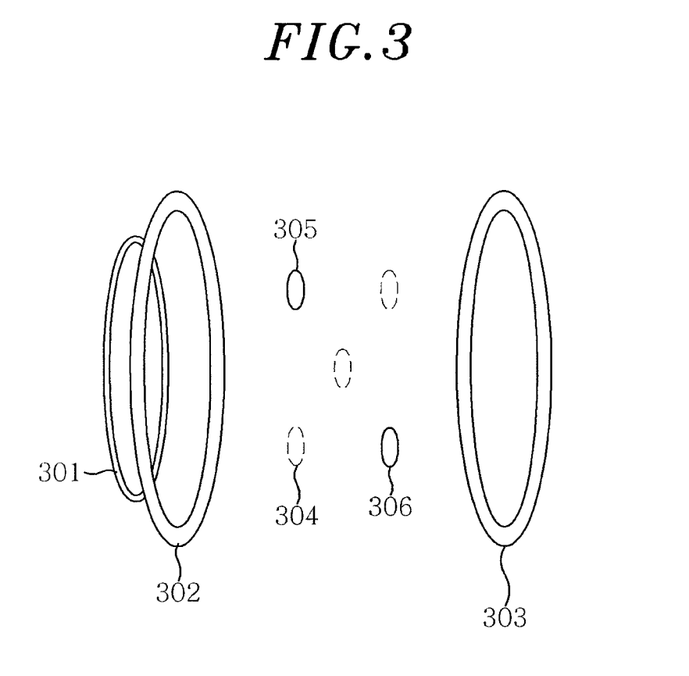
FIG. 3 is a diagram showing a result of the fabrication of a small-sized resonator in accordance with an embodiment of the present invention.

The structure of the small-sized reception resonator 104 that is applied to the embodiment of the present invention is shown in FIG. 3.

FIG. 3 is a diagram showing a result of the fabrication of the small-sized resonator in accordance with an embodiment of the present invention. This structure has been reduced in size through C-C matching. That is, as shown in FIG. 3, from an LC viewpoint of resonance, if resonance is sought to be performed, there must be an inductance L and capacitance C, and an imaginary number part of the impedance must be 0. First, complex impedance is expressed by Equation 1 below.

$$Z = R + jX = R + jwL + \frac{1}{jwC}$$ [Equation 1]

In Equation 1, frequency where imaginary number impedance X becomes 0 and thus disappears is the resonant frequency, and the imaginary number impedance X is expressed by Equation 2 below.

$$X = \omega L - \frac{1}{\omega C} = 2\pi fL - \frac{1}{2\pi fC} = 0$$ [Equation 2]

The resonant frequency can be determined as in Equation 3 below by summarizing Equation 2 into frequency f.

$$\text{resonance frequency} = \frac{1}{2\pi\sqrt{LC}}$$ [Equation 3]

In Equation 3, if a magnetic resonator is sought to be fabricated, the magnetic resonator has to have a sufficiently high inductance (L) value in order to fabricate the magnetic resonator having a high Q value, and the magnetic resonator is fabricated using parasitic capacitance C. For example, an important design factor may be the fabrication of a coil configured to have a high inductance (L) value in order to embody the magnetic resonator having a high Q value. In the complex impedance of Equation 1, if the imaginary number impedance is made 0, a resonant condition can be set. If the small-sized reception resonator 104 is a device having the inductance L, resonance can be secured by securing additional capacitance C in order to obtain the resonance from a desired frequency. If the complex impedance Z is R+jX, resonance can be generated by constructing a porter having the complex impedance of R−jX. If the resonant frequency is 1.8 MHz and the small-sized reception resonator 104 has a very small diameter ranging from 50 mm to 70 mm, a resonator may have a Q value of 100 or higher.

The embodiment of the present invention has been illustrated as receiving energy using one small-sized reception resonator 104, but a plurality of the small-sized reception resonators 104 can be installed within the space 105 in order to transmit power in multiple ways. That is, as shown in FIG. 3, a plurality of small-sized reception resonators 304, 305, and 306 may be disposed between a transmission resonator 302 and a relay resonator 303, and the small-sized reception resonators 304, 305, and 306 can receive power freely at different positions. Furthermore, the small-sized reception resonators 304, 305, and 306 can receive power in parallel.

Figure 4A:
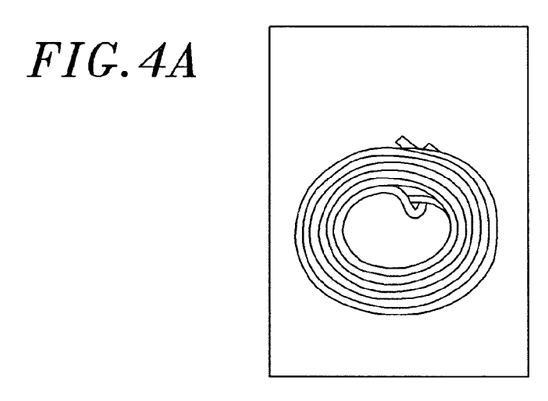
FIGS. 4A to 4C are exemplary diagrams showing the structure of a wireless power transmission apparatus in accordance with another embodiments of the present invention.
Figure 4B:
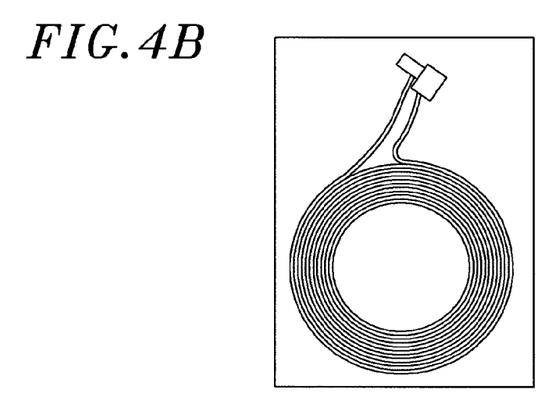
Figure 4C:
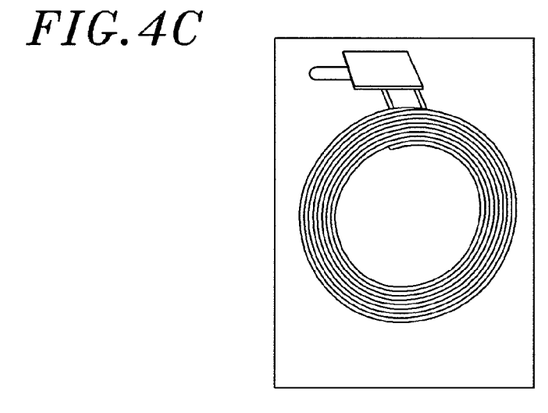

FIGS. 4A to 4C are exemplary diagrams showing the structure of a wireless power transmission apparatus in accordance with another embodiments of the present invention.

Examples in which the wireless power transmission apparatus having a structure, such as that described above, is actually applied are described with reference to FIGS. 5 to 7.

Figure 5:
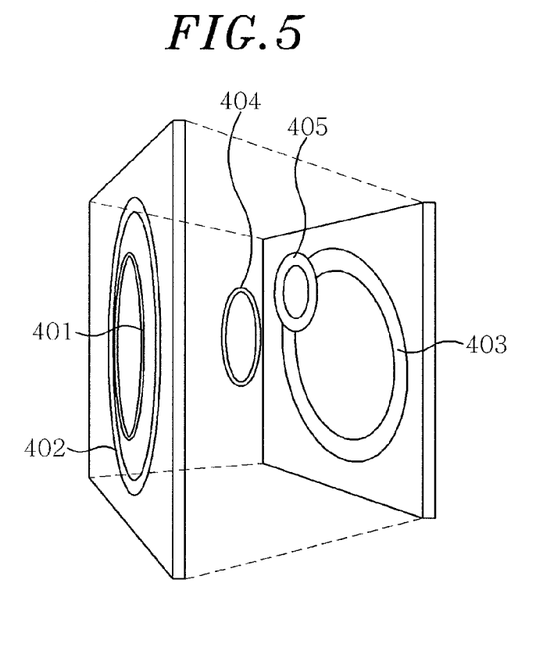
FIG. 5 is a diagram showing an evaluation that is experimentally performed to determine whether the wireless power transmission apparatus in accordance with the embodiment of the present invention may be used in an actual structure.

FIG. 5 is a diagram showing an evaluation that is experimentally performed to determine whether the wireless power transmission apparatus in accordance with the embodiment of the present invention may be used in an actual structure.

As shown in FIG. 5, a transmission resonator 402 has an actual diameter of 300 mm, and a relay resonator 403 also has an actual diameter of 300 mm. Here, one small-sized reception resonator 404 has an actual diameter of 130 mm, and the other small-sized reception resonator 405 has an actual diameter of 70 mm. In this case, it was checked that power transmission efficiency of 60% or higher was transferred everywhere within a box structure indicated by a dotted line. If each of the diameter of the transmission resonator 402 and the relay resonator 403 is increased to 2 m or 4 m and the transmission resonator 402 and the relay resonator 403 are installed in the surfaces of walls on both sides of one room within a house or one office, power can be transferred wirelessly using the small reception resonator everywhere in the room or the office.

Figure 6:
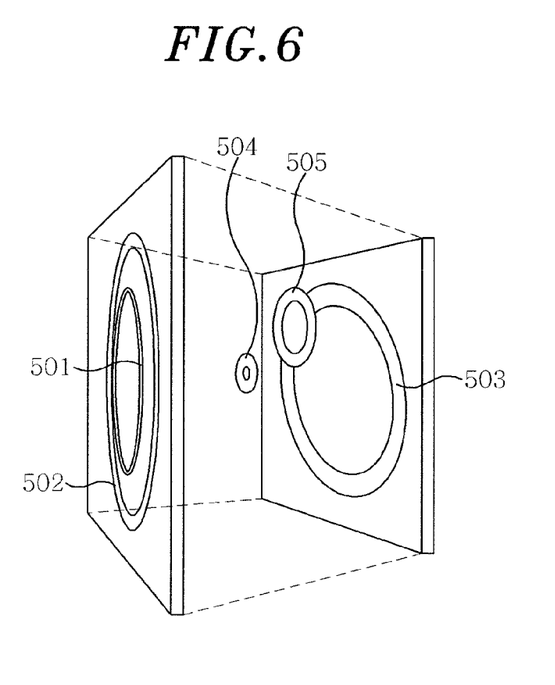
FIG. 6 is a diagram showing an evaluation that is experimentally performed to determine whether the wireless power transmission apparatus in accordance with the embodiment of the present invention may be used in an actual structure as another small resonator.

FIG. 6 is a diagram showing an evaluation that is experimentally performed to determine whether the wireless power transmission apparatus in accordance with the embodiment of the present invention may be used in an actual structure as another small resonator.

As shown in FIG. 6, a transmission resonator 502 has an actual diameter of 300 mm, and a relay resonator 503 has an actual diameter of 300 mm. Here, one small-sized resonator 504 has an actual diameter of 50 mm, and the other small-sized resonator 505 has an actual diameter of 70 mm. In this case, it has been checked that power transmission efficiency of 60% or higher has been transferred everywhere within a box structure indicated by a dotted line.

Figure 7:
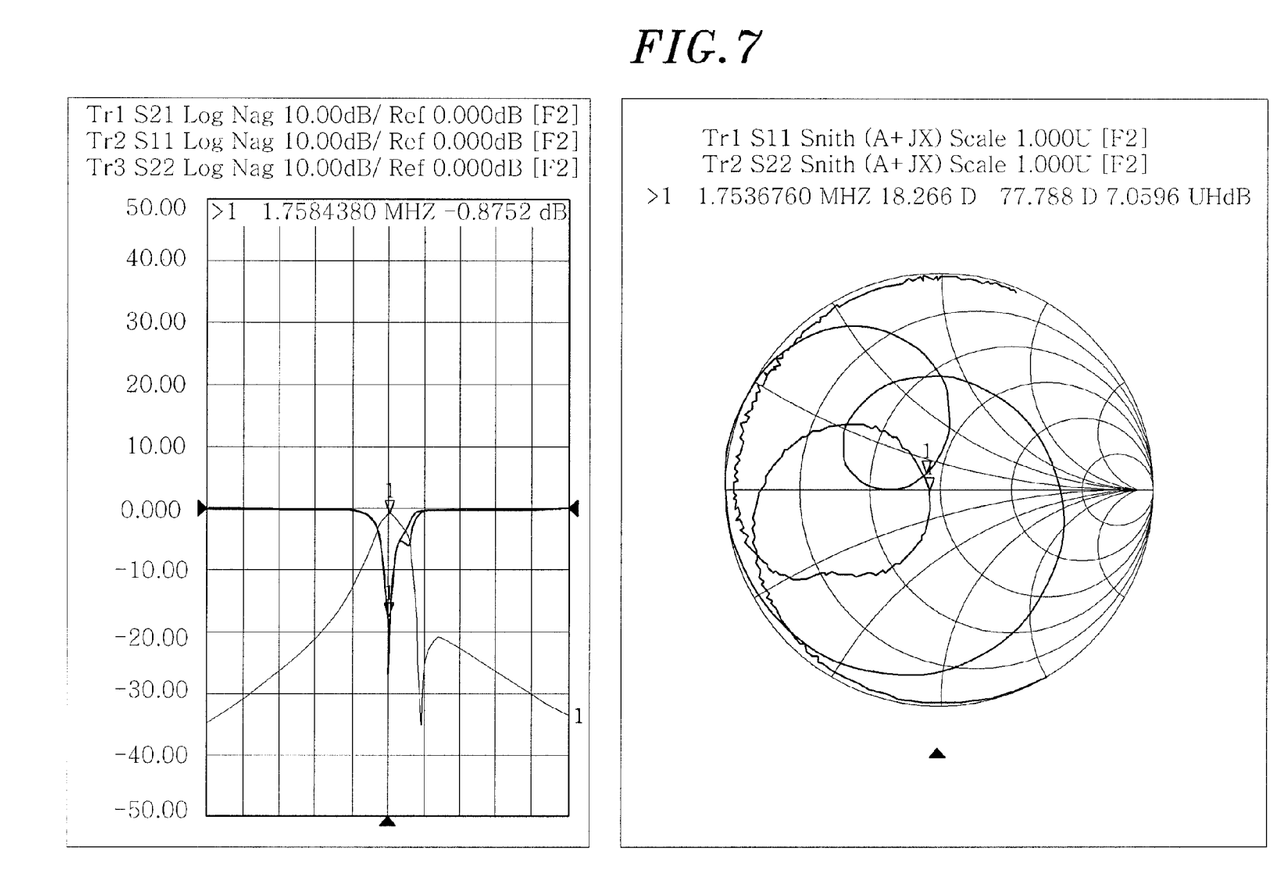
FIG. 7 is a diagram showing the results of power transmission efficiency that has been measured by a network analyzer using a small-sized resonator of FIG. 5.

FIG. 7 is a diagram showing the results of power transmission efficiency that has been measured by a network analyzer using the small-sized reception resonator 404 of FIG. 5. A resonant frequency is generated near 1.758 MHz, and the small-sized reception resonator 404 has power transmission efficiency of 82% when an insertion loss S21 thereof is −0.8752 dB.

Examples in which the wireless power transmission apparatus having a structure, such as that described above, is actually applied are described with reference to FIGS. 8 to 10.

Figure 8:
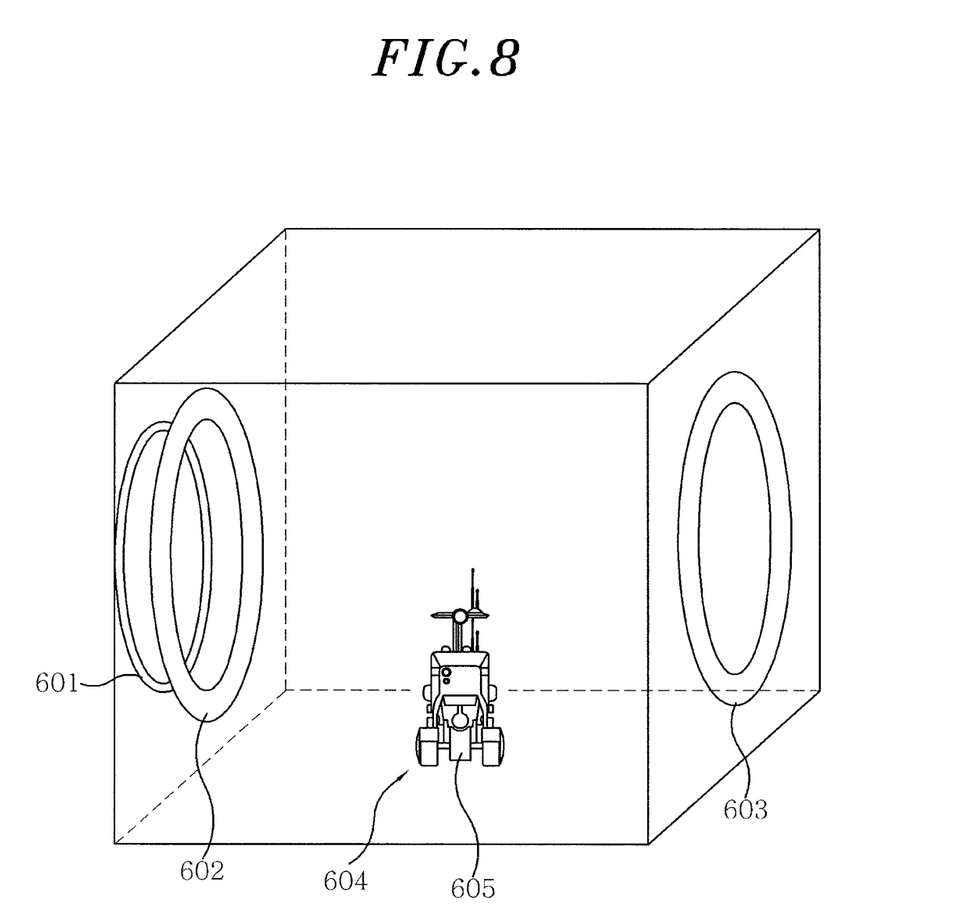
FIG. 8 is a diagram showing an example to which the wireless power transmission apparatus in accordance with the embodiment of the present invention is applied.

FIG. 8 is a diagram showing an example to which the wireless power transmission apparatus in accordance with the embodiment of the present invention is applied. If a reception resonator 605 in accordance with the embodiment of the present invention is installed in a moving body 604, such as a robot placed within an office or a room, in the state in which a transmission resonator 602 is installed in the surface of a wall within the office or the room and a relay resonator 603 is installed in the surface of a wall on the opposite side, the moving body 604 can be supplied with power wirelessly. Here, the reception resonator 605 installed in the moving body 604 has a very smaller size than the transmission resonator 602, but has the same resonant frequency as the transmission resonator 602.

Figure 9:
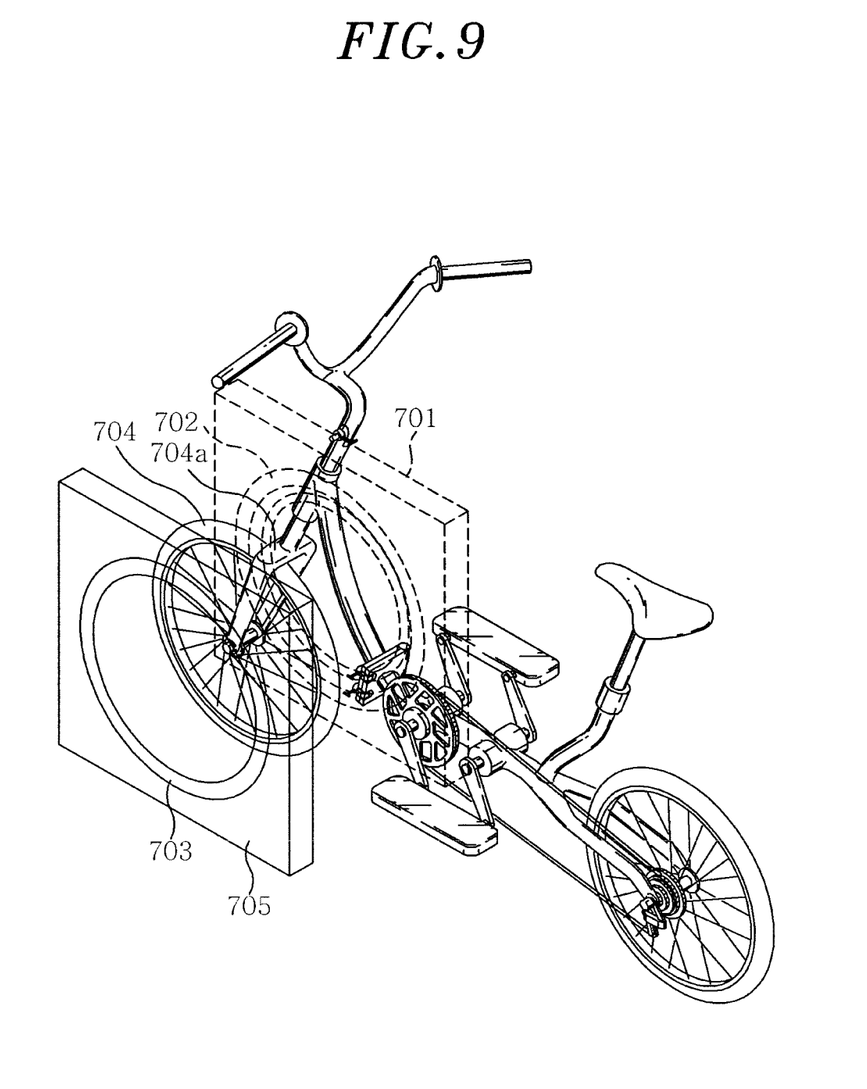
FIG. 9 is a diagram showing another example to which the wireless power transmission apparatus in accordance with the embodiment of the present invention is applied.

FIG. 9 is a diagram showing another example to which the wireless power transmission apparatus in accordance with the embodiment of the present invention is applied. FIG. 9 shows a wireless power transmission structure for a bicycle.

If the bicycle is parked in a bicycle parking lot as shown in FIG. 9, first and second fixtures 701 and 705 for fixing a bicycle wheel 704 are installed in the bicycle parking lot. In this state, if a transmission resonator 702 is installed in one face of the first fixture 701, a relay resonator 703 is installed in one face of the second fixture 705, and a small-sized resonator 704a is installed in the bicycle wheel 704 between the transmission resonator 702 and the relay resonator 703, power can be transmitted wirelessly.

Figure 10:
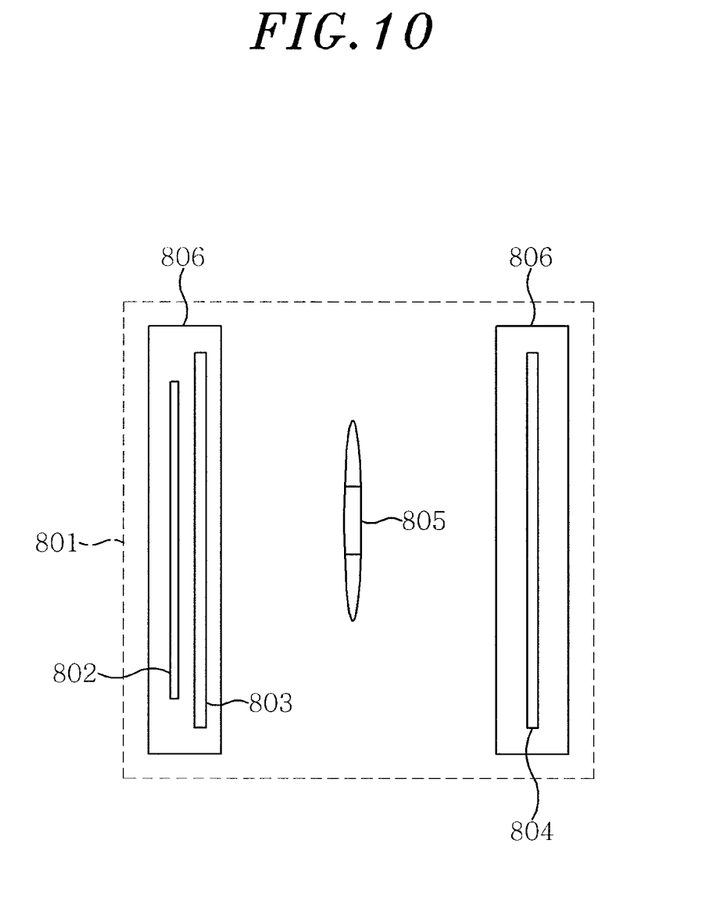
FIG. 10 is a diagram showing contents regarding the shielding of wireless power in order to protect the human body and devices when the power is transmitted within a specific area wirelessly.

FIG. 10 is a diagram showing contents regarding the shielding of wireless power in order to protect the human body and devices when the power is transmitted within a specific area wirelessly. An electromagnetic field that is exposed from a transmission resonator 803 and a transmission feeding loop 802 to the rear or sides thereof can be shielded using a shielding body or a shielding sheet 806 by installing the shielding body or the shielding sheet 806 in the rear part of the transmission resonator 803 and the transmission feeding loop 802.

Furthermore, an electromagnetic field that is exposed from a relay resonator 804 to the rear or sides thereof can be shielded using a shielding body or the shielding sheet 806 by installing the shielding body or the shielding sheet 806 in the rear part of the relay resonator 804. A reception resonator 805 is installed within a space 801, and it receives power wirelessly everywhere within the space 801.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A wireless power transmission apparatus, comprising:
a transmission resonator installed in one side wall within a specific space, a transmission feeding loop installed in the one sidewall adjacent to the transmission resonator and configured to perform an impedance matching for the transmission resonator and transmit and receive power between the transmission resonator, wherein the transmission resonator is configured to receive and transmit power using the transmission feeding loop;
a relay resonator installed in another side wall within the specific space and configured to have a resonant frequency identical with that of the transmission resonator and store energy in the specific space by generating mutual resonance through a resonance characteristic with the transmission resonator; and
one or more reception resonators installed within the specific space and configured to have a resonant frequency identical with that of the transmission resonator and receive the energy stored in the specific space, wherein none of the one or more reception resonators have a feeding loop.

2. The wireless power transmission apparatus of claim 1, wherein the reception resonator has a structure of a direct feeding method.

3. The wireless power transmission apparatus of claim 1, wherein the resonant frequency ranges from 1.7 MHz to 1.8 MHz.

4. The wireless power transmission apparatus of claim 1, wherein the reception resonators are attached to a robot or a moving body within the specific space.

5. The wireless power transmission apparatus of claim 1, wherein the transmission resonator and the transmission feeding loop are sealed by a shielding body or a shielding sheet for shielding an electromagnetic magnetic field generated from the transmission resonator and the transmission feeding loop.

6. The wireless power transmission apparatus of claim 1, wherein the relay resonator is sealed by a shielding body or a shielding sheet for shielding an electromagnetic field generated from the relay resonator.

7. The apparatus of claim 1, wherein each of the reception resonators has a diameter ranging from 50 mm to 70 mm.

8. The wireless power transmission apparatus of claim 1, wherein the relay resonator is installed in another side wall without a feeding loop.

9. A wireless power transmission apparatus for wirelessly transmitting power to a moving body provided with a wheel, comprising:
a transmission resonator installed in a first fixture for fixing one part of the wheel and a transmission feeding loop installed in the first fixture adjacent to the transmission resonator and configured to perform an impedance matching and transmit and receive power between the transmission resonator, wherein the transmission resonator is configured to receive and transmit power using the transmission feeding loop;
a relay resonator installed in a second fixture for fixing another part of the wheel and configured to have a resonant frequency identical with a resonant frequency of the transmission resonator and store energy in a space between the first and the second fixtures by generating mutual resonance through a resonance characteristic with the transmission resonator; and
one or more reception resonators installed within the specific space and configured to have a resonant frequency identical with a resonant frequency of the transmission resonator and receive the energy stored in the space between the first and the second fixtures, wherein none of the one or more reception resonators have a feeding loop.

10. The apparatus of claim 9, wherein the reception resonator has a structure of a direct feeding method.

11. The apparatus of claim 9, wherein the resonant frequency ranges from 1.7 MHz to 1.8 MHz.

12. The apparatus of claim 9, wherein each of the reception resonators has a diameter ranging from 50 mm to 70 mm.

13. The wireless power transmission apparatus of claim 9, wherein the relay resonator is installed in another side wall without a feeding loop.

* * * * *